United States Patent
Tulloch et al.

[19]

[11] Patent Number: 6,134,258
[45] Date of Patent: Oct. 17, 2000

[54] TRANSVERSE-PUMPED SLAB LASER/AMPLIFIER

[75] Inventors: William Tulloch; Todd Rutherford; Robert L. Byer, all of Stanford, Calif.

[73] Assignee: The Board of Trustees of the Leland Stanford Junior University, Palo Alto, Calif.

[21] Appl. No.: 09/047,885

[22] Filed: Mar. 25, 1998

[51] Int. Cl.$^7$ .................................................. H01S 3/06
[52] U.S. Cl. .............................. 372/99; 372/36; 372/66; 372/70; 372/75
[58] Field of Search ......................... 372/34–36, 39–42, 372/66, 69, 70, 75, 92, 99

[56] References Cited

U.S. PATENT DOCUMENTS

| | | | |
|---|---|---|---|
| 3,423,693 | 1/1969 | Chernoch et al. | 372/67 |
| 3,633,126 | 1/1972 | Martin et al. | 372/35 |
| 3,679,999 | 7/1972 | Chernoch | 372/35 |
| 4,653,056 | 3/1987 | Baer et al. | 372/27 |
| 4,710,940 | 12/1987 | Sipes, Jr. | 372/75 |
| 4,949,346 | 8/1990 | Kuper et al. | 372/36 |
| 5,305,345 | 4/1994 | Albrecht et al. | 372/69 |
| 5,363,391 | 11/1994 | Matthews et al. | 372/36 |
| 5,479,430 | 12/1995 | Shine, Jr. et al. | 372/66 |
| 5,557,628 | 9/1996 | Kuba et al. | 372/70 |
| 5,651,021 | 7/1997 | James et al. | 372/92 |
| 5,841,805 | 11/1998 | Injeyan et al. | 372/69 |

OTHER PUBLICATIONS

Kiriyama, H., Highly efficient thermal–birefringence–compensated laser–diode pumped novel eight–pass Nd:YAG slab amplifier, Ins. Laser Eng., Osaka University, USA–JApan Workshop on Development of LD Pumped Solid State Laser, 1997 (May).

Koechner, W., Solid–State Laser Engineering, Springer Series in Optical Sciences, Springer Verlag New York Heidelberg, Berlin 1976, pp. 390–396.

Byer, R., Diode laser–pumped solid–state lasers, Science, 239, pp. 742–747, 1988. (Feb.).

Farinas, A. et al., Design and characterization of a 5.5 W, cw, injection–locked, fiber–coupled, laser–diode–pumped Nd:YAG miniature slab laser, Op. Lett., 19(2), pp. 114–116, 1994 (Jan.).

Shine, R., et al., 40–W, cw, TEM00–mode, diode laser pumpped, Nd:YAG minature–slab laser, Optics Letters, 20(5), pp. 459–461, 1995 (Mar.).

Richards, J., et al., Versatile, efficient, diode–pumped minature slab laser, Opt. Lett., 20(4), pp. 371–373, 1995. (Feb.).

*Primary Examiner*—John D. Lee
*Attorney, Agent, or Firm*—Lumen Intellectual Property Service

[57] ABSTRACT

A light amplification device comprises a laser slab and optics for establishing an optical beam at the lasing wavelength. The beam travels inside the slab in a zig-zag path between two reflecting faces. The slab is also cooled through the reflecting faces. The slab is pumped through one or more pumping faces, each pumping face being distinct from the reflecting faces. Light from the pump is incident upon the slab in a direction that is transverse to the plane of propagation of the lasing wavelength beam. This arrangement separates the cooling interfaces from the pumping interfaces. Distortions in the beam due to thermal effects are largely averaged out by the zig-zag path. The device may function as either a laser or an optical amplifier.

32 Claims, 10 Drawing Sheets

TRANSVERSE-PUMPED SLAB LASER/ AMPLIFIER

STATEMENT REGARDING FEDERALLY SPONSORED RESEARCH OR DEVELOPMENT

This invention was supported in part by grant number DAAH04-94-G-0019 from the Army and grant number NSF PHY-96-30172 from the National Science Foundation. The Government has certain rights in the invention.

FIELD OF THE INVENTION

The present invention relates generally to solid state lasers and amplifiers, and in particular to a light amplification device having a laser slab with separate pumping and cooling faces.

BACKGROUND

Solid state lasers have been found increasingly useful for generating high power laser beams. A solid state laser includes two main parts: a solid laser medium and a pump source. In many applications, the pump source is itself another laser or array of lasers. For example, a GaAlAs diode laser is often used as the pump source for a Nd:YAG laser, since the emission of the diode laser overlaps the absorption band of the Nd ion.

Solid state lasers suffer from a problem, however. The input pump energy inevitably heats up the laser medium. This heating distorts the laser beam for three reasons. First, the index of refraction of the laser medium depends on its temperature, so a temperature gradient within the medium creates a lens, called a "thermal lens". Second, thermal stresses are induced in the laser medium by heating, and these stresses further alter the index of refraction in the direction parallel to the direction of the stress. This directional index change is referred to as "stress birefringence." Third, the laser medium expands when heated and thereby changes its shape. These three effects are undesirable since they distort the optics within the laser cavity.

Solutions to the thermal lensing and stress birefringence problems are known in the art. When the solid laser medium is in the shape of a slab, for example, these problems are ameliorated by causing the laser beam to travel in a zig-zag path within the slab. The zig-zag path moves back and forth across different temperature regions, thereby averaging out the thermal effects to first order. For more information on slab lasers, see for example Walter Koechner, *Solid-Sate Laser Engineering,* Springer-Verlag (New York, 1976) Sec. 7.3; J. M. Eggleston et al., "The Slab Geometry Laser—Part I: Theory," IEEE Journal of Quantum Electronics QE-20, 289 (1984); and Robert L. Byer, "Diode Laser-Pumped Solid-State Lasers," Science 239, 742 (1988). See also U.S. Pat. No. 3,633,126 issued to Martin and Chernoch, U.S. Pat. No. 4,949,346 issued to Kuper and Rapaport, and U.S. Pat. No. 5,363,391 issued to Matthews, Sorce, and Palombo.

FIG. 1 shows an example of a prior art solid slab laser as disclosed in U.S. Pat. No. 5,479,430 issued to Shine. A laser slab is pumped by a plurality of diode lasers which are positioned above and below the slab. The slab is cooled through the upper and lower faces, the same faces through which the pump light enters. A one-dimensional thermal gradient exists in the vertical direction, with the slab being cooler at the upper and lower faces and warmer in the middle. Since the laser beam zig zags between the upper and lower faces, thermal lensing and stress birefringence effects are nearly averaged out, leaving the beam essentially undistorted.

However, problems still exist with this slab laser. First, the slab is difficult to cool. It is cooled by flowing liquid over the upper and lower faces, but since the slab is cooled and pumped through the same faces, a sophisticated plumbing apparatus must be provided to allow the cooling liquid to flow around the pump optics.

There is another problem with the cooling. The laser beam follows a zig-zag path inside the slab, reflecting from each face by total internal reflection. However, fluid circulates over these faces, and the fluid is heated by the slab. Therefore, local changes in the index of refraction of the fluid occur, causing phase changes in the reflected beam. These phase changes are not uniform across the profile of the beam. Furthermore, if the fluid is not perfectly clean, it can deposit dust or other particles on the reflecting surfaces. These particles can lead to laser radiation damage to the surfaces.

Another problem with the conventional slab lasers concerns a restriction on the power of the output laser beam. There is a limit to the amount of power that may be pumped into the slab because the thermal stresses within the slab can cause the slab to fracture. The maximum power per unit length, $(P/l)_{max}$, that may be pumped into the slab of FIG. 1 is determined by the laser medium geometry and material parameters and is proportional to the ratio of the width of the slab $w_1$, to its thickness $t_1$:

$$(P/l)_{max} \alpha w_1/t_1 \qquad (1)$$

Therefore, if $t_1$ is decreased, the power input can be increased. However, when $t_1$ is decreased, the amount of input energy that is absorbed by the slab will decrease since the optical path length of the pump beams in the slab will be shorter. Thus, there is a tradeoff between the amount of power that may be pumped into the slab and the amount of power that the slab can absorb. This tradeoff is a disadvantage, because to optimize the power of the output laser beam, both the pump power and the absorption should be maximized simultaneously.

In an effort to overcome the difficulties with the cooling liquid, Chernoch (U.S. Pat. No. 3,679,999), Kuper et al. (U.S. Pat. No. 4,949,346) and Matthews et al. (U.S. Pat. No. 5,363,391) designed lasers with passive cooling systems, using either a solid or a gas as a heat sink. In these designs, the pump light enters the laser slab through the heat sinks. Therefore the heat sink material must be transparent to the pump light. This requirement severely limits the choice of heat sinks, compromising the range of thermal conductivities available.

Farinas, Gustafson, and Byer (Optics Letters 19 (1994) pp. 114–116) also developed a laser that uses passive cooling by conduction. The laser uses solid heat sinks to cool the front and back faces of the slab of FIG. 1, rather than the top and bottom faces as had been cooled before. Because the cooling faces are distinct from the pump faces, the heat sinks need not be transparent, and can be made from any material with a high heat conductivity, such as metal. This cooling technique avoids the problems of the liquid coolants. However, the plane of propagation of the laser is no longer in the same plane as the thermal gradients. Therefore, the thermal lensing and stress birefringent effects mentioned earlier are not averaged out by the zig-zag path.

SUMMARY

It is a primary object of the present invention to provide a light amplification device that is capable of a high power output, is easily and efficiently cooled, and minimizes the effects of thermal lensing and stress birefringence.

The light amplification device comprises a solid laser slab having first and second reflecting faces, a first pumping face, and at least one end face. An optical pump irradiates the slab through the pumping face. In the preferred embodiment, heat sinks conduct heat away from each of the reflecting faces. Optics are provided for causing an optical beam at the lasing wavelength to propagate within the slab in a zig-zag path between the two reflecting faces. Each reflecting face is covered with a reflective layer to ensure that the beam reflects, either by total internal reflection or by directly reflecting off the reflective layer. The beam passes out of the slab through the end face.

The zig-zag path of the beam at the lasing wavelength lies in a plane. The heat sinks establish a one-dimensional thermal gradient within the slab. This gradient lies in the plane of the zig-zag propagation of the beam.

In a preferred embodiment of this invention, the optics that cause the optical beam to propagate comprise a resonator composed of an output coupler and at least one mirror. In this embodiment, the light amplification device functions as a laser oscillator. Alternatively, the optics may comprise an external laser so that the light amplification device functions as an optical amplifier.

The heat sinks cool the laser slab through the reflecting faces, and the reflecting faces are distinct from the pumping face. In the preferred embodiment, light from the pump is incident upon the slab in a direction perpendicular to the plane of propagation of the beam at the lasing wavelength. This new relation between the pump light and the lasing wavelength beam yields a pumped laser that has the following advantages:

First, the heat sinks may be made of any material; they need not be transparent since they need not transmit the pump light. The heat sinks can be chosen for their thermal properties alone, without regard to their optical properties.

Second, the cooling system for the slab is easy to engineer: because the slab is not pumped through the same faces through which it is cooled, the pumping and cooling systems may be designed separately. In particular, an efficient passive cooling system comprising two solid heat sinks may be used, rather than the awkward and difficult liquid coolants used in prior art.

Third, the maximum power per unit length, $(P/l)_{max}$, that may be pumped into the slab is, as in the prior art, proportional to the ratio of the width to the thickness of the slab: $(P/l)_{max} \alpha w/t$. However, in contrast to the prior art, to increase the pump absorption, w should be increased, not t. Therefore increasing w increases both the amount of pump light absorbed and the amount of pump light that can be input. The two desired features of high input power and high absorption are now in concordance, not in conflict.

Fourth, the laser beam has a zig-zag path in the same plane as the thermal gradient, so the thermal lensing and stress birefringent effects are almost completely eliminated by the zig-zag optical path.

Furthermore, in a second embodiment an external laser beam is provided, and the invention serves as an optical amplifier. This amplifier has all of the advantages cited above.

DETAILED DESCRIPTION

Figure 1:
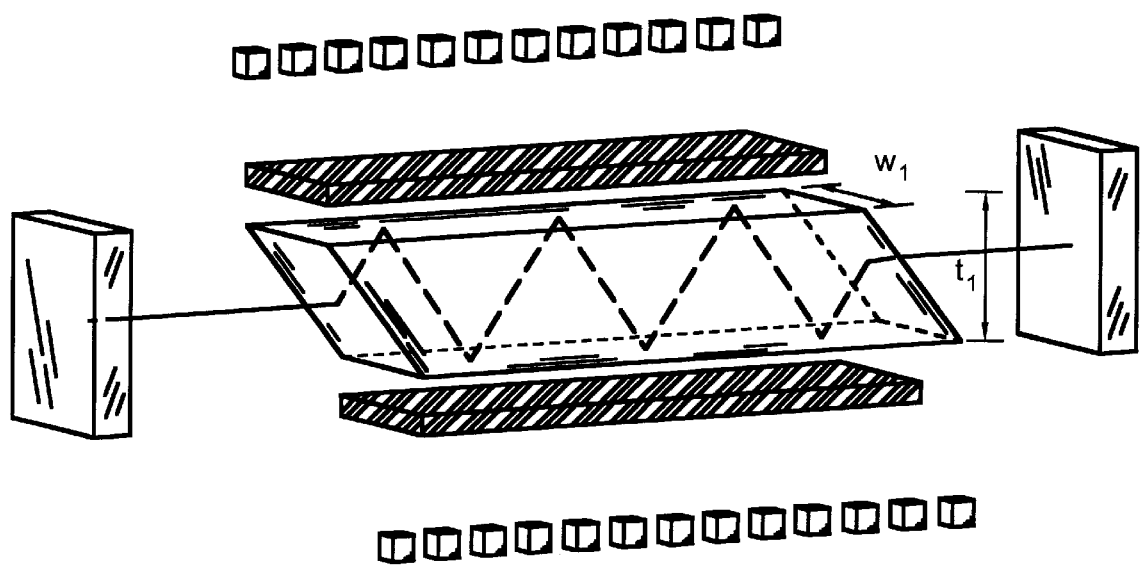
FIG. 1 shows a prior art slab laser.
Figure 2:
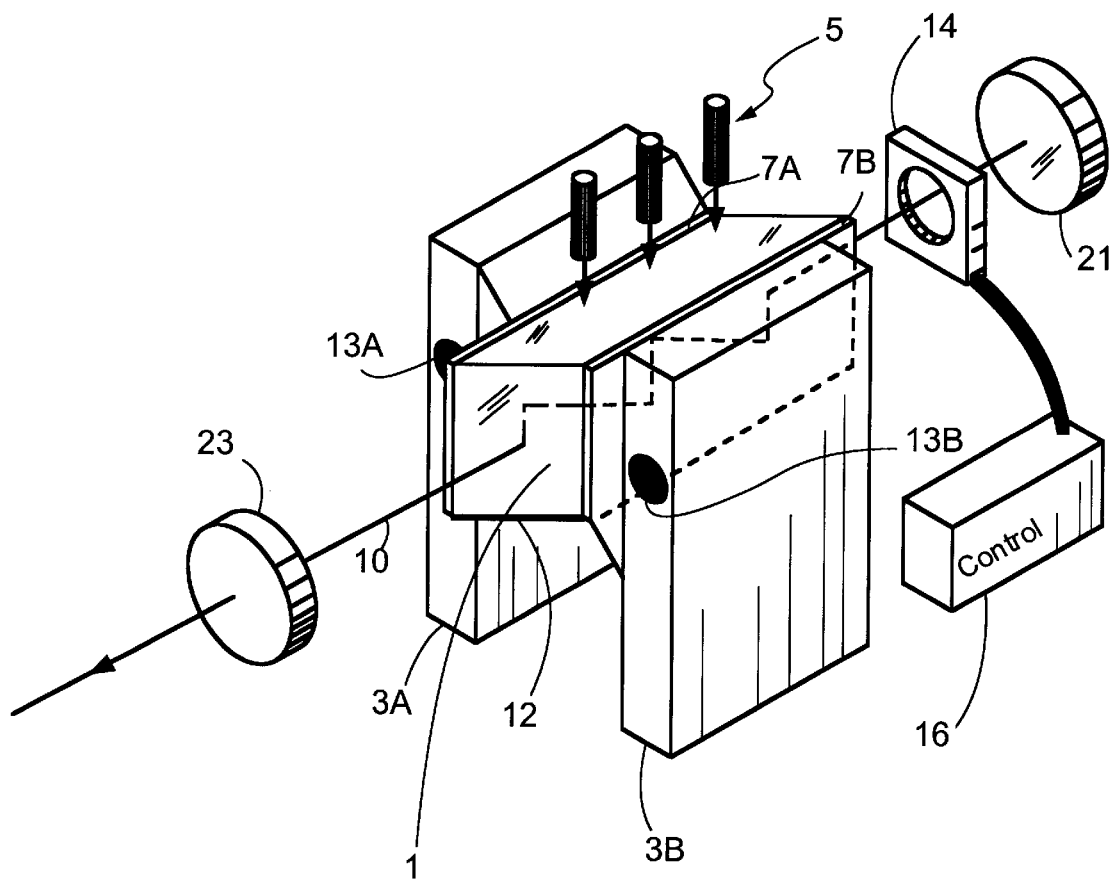
FIG. 2 is a three-dimensional view of a laser oscillator according to a preferred embodiment of the invention.
Figure 4:
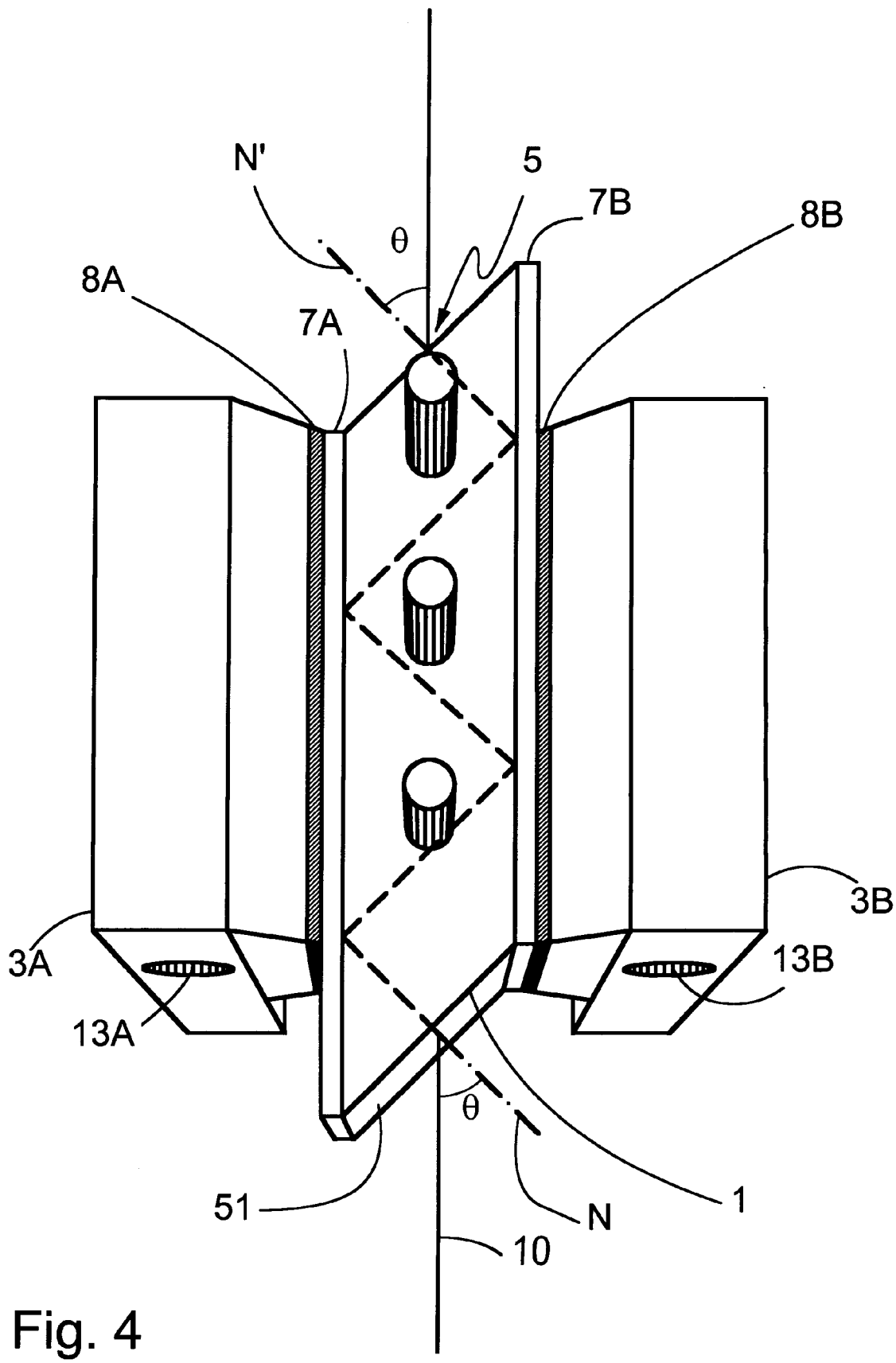
FIG. 4 is a top view of the laser oscillator of FIG. 2.
Figure 5:
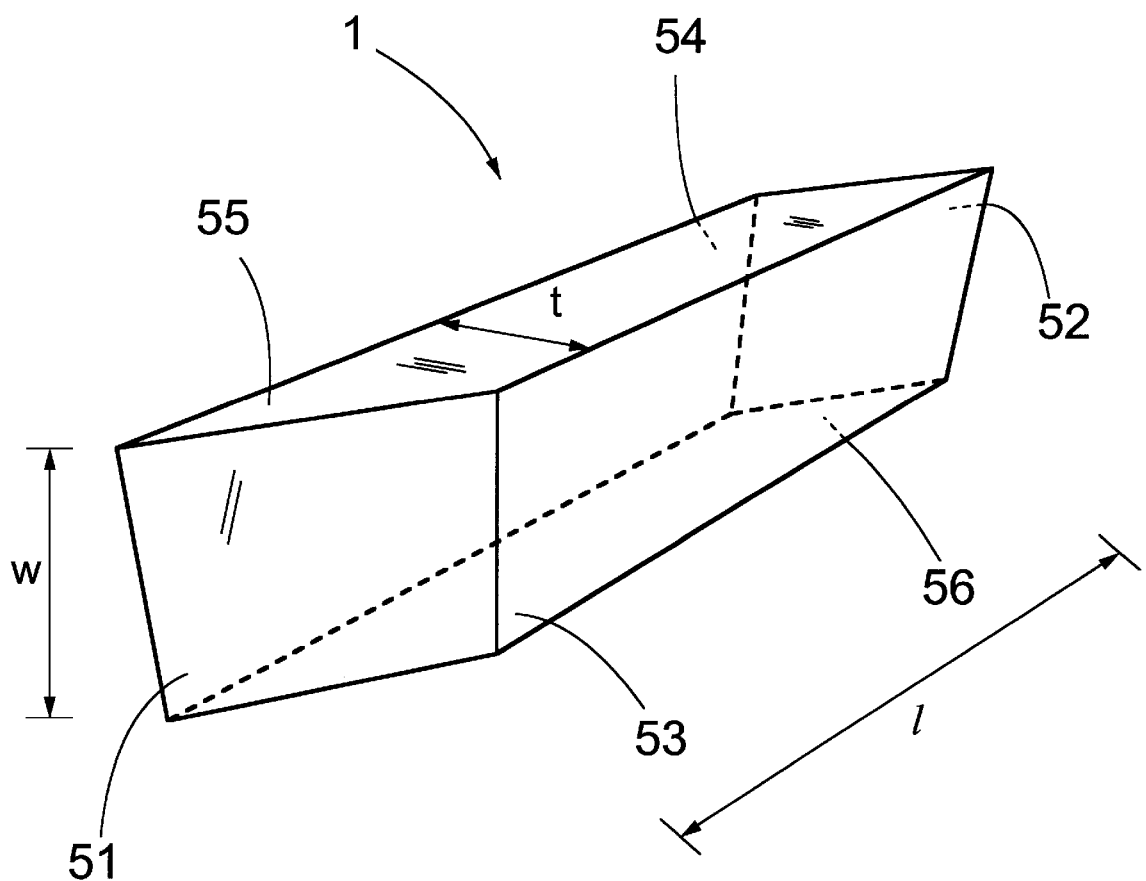
FIG. 5 is a close-up view of a laser slab of the laser oscillator of FIG. 2.

The preferred embodiment of a light amplification device is shown in FIG. 2 and FIG. 4. The device includes a laser slab 1. A close-up of slab 1 is shown in FIG. 5. Slab 1 has end faces 51 and 52, reflecting faces 53 and 54, a top face 55, and a bottom face 56. The length of reflecting faces 53 and 54 is l. The distance between the reflecting faces is the thickness t of the slab. The distance between top face 55 and bottom face 56 is the width w of the slab.

As shown in FIG. 2 and FIG. 4, attached to the two reflecting faces are reflective layers 7A and 7B. An optical beam 10 propagates through slab 1 in a zig-zag fashion between the reflecting faces. In the preferred embodiment, reflective layers 7A and 7B comprise a material having a sufficient index of refraction to cause beam 10 to undergo total internal reflection upon encountering either reflecting face 53 or 54. Beam 10 propagates in a plane that is parallel to top face 55 and to bottom face 56.

Optical beam 10 enters and exits slab 1 through end faces 51 and 52. In the preferred embodiment, end faces 51 and 52 are not at right angles to reflecting faces 53 and 54. This geometry causes beam 10 to refract upon entering slab 1 and travel along a zig-zag path. As shown in FIG. 4, beam 10 makes an angle $\theta$ with respect to a normal N to end face 51. Beam 10 also makes angle $\theta$ with respect to a normal N' to end face 52. In the preferred embodiment, $\theta$ is equal to Brewster's angle to minimize reflections.

Referring again to FIG. 2, slab 1 is pumped by an optical pump 5. Pump 5 excites a metastable state within laser slab 1, causing a population inversion. In the preferred embodiment, optical pump 5 comprises one or more diode laser arrays; each array comprises multiple diode lasers. Each array preferably comprises 24 or more diode lasers. Further, pump 5 may comprise as many arrays as is feasible. Pump 5 preferably comprises 10 to 20 or more diode laser arrays. For simplicity of illustration, however, only three diode laser arrays are shown in FIG. 2.

Light from optical pump 5 enters slab 1 through top face 54. Top face 54 is called a pumping face, since it receives light from optical pump 5. The diode lasers that comprise optical pump 5 may be directly coupled to slab 1, or may be coupled using fiber optics, lenses, or other optics well known in the art. Light from optical pump 5 is incident upon slab 1 in a direction that is perpendicular to the plane of propagation of beam 10. Optical pump 5 may be a continuous wave (CW) or quasi-CW source of input light.

Heat sinks 3A and 3B cool slab 1 by drawing heat from reflecting faces 53 and 54. Heat sinks 3A and 3B may be attached directly to reflective layers 7A and 7B. It is preferred, however, that a thermal contact layer 8A is placed between reflective layer 7A and heat sink 3A, as shown in FIG. 4. Another thermal contact layer 8B is placed between reflective layer 7B and heat sink 3B. Thermal contact layers 8A and 8B ensure an efficient thermal contact between the reflective layers and the heat sinks. Thermal contact layers 8A and 8B are good conductors of heat, and are soft compared to heat sinks 3A, 3B and slab 1. This softness allows the thermal contact layers 8A and 8B to conform to any irregularities in the heat sinks 3A and 3B or reflective layers 7A and 7B when the heat sinks are tightened against the reflective layers. Suitable materials for thermal contact layers 8A and 8B include gold, indium, and copper. Gold is the preferred material since gold has the added feature that it efficiently reflects light from optical pump 5.

In the preferred embodiment, heat sinks 3A and 3B comprise metal, since metal has a high thermal conductivity. Slab 1 is heated from the inside via the energy from pump 5, and is cooled from the outside by heats sinks 3A and 3B. Therefore a temperature difference, or gradient, is set up inside slab 1. Because heat flows into heat sinks 3A and 3B in a direction that is parallel to the plane of propagation of beam 10, the temperature gradient is in the same plane as the plane of propagation of beam 10. Therefore, thermally induced variations of the index of refraction are substantially averaged out as beam 10 traces its path through slab 1, so unwanted thermal lensing and stress birefringence effects are minimized.

In the preferred embodiment, heat sinks 3A and 3B have identical construction. This allows slab 1 to be cooled symmetrically, thereby preventing slab 1 from flexing due to stresses induced by asymmetric cooling. Heat sinks 3A and 3B, in the preferred embodiment, have holes 13A and 13B drilled through them to allow water or other fluid to be piped through. This allows for heat sinks 3A and 3B to be cooled, and therefore for heat sinks 3A and 3B to remove heat effectively from slab 1.

The bottom face 56 of slab 1 is covered with a pump reflector 12 that reflects light from optical pump 5. Bottom face 56, like top face 55, is a pumping face, since light from pump 5 travels through slab 1, is reflected by pump reflector 12, and re-enters slab 1 through bottom face 56. Pump reflector 12 comprises a material that reflects light at the same wavelength as light emitted from optical pump 5. Preferably, pump reflector 12 comprises a metal, a dielectric coating, or a diffusely reflecting material such as Spectralon (R), a material comprising TFE available from DuPont Corporation. Alternatively, bottom face 56 may not be covered with pump reflector 12; instead, another optical pump may input light through bottom face 56.

Moreover, an anti-reflection coating may be placed on top face 55 to reduce reflections from slab 1 back into optical pump 5. When an additional optical pump is used to input light through bottom face 56, an anti-reflection coating may also be placed on bottom face 56.

In order to cause beam 10 to propagate, optics are included. Such optics are well known in the art. In FIG. 2 these optics comprise a mirror 21 and an output coupler 23. Mirror 21 and output coupler 23 together function as a resonator. Therefore, in the embodiment of the light amplification device shown in FIG. 2, the device functions as a laser oscillator.

Figure 3:
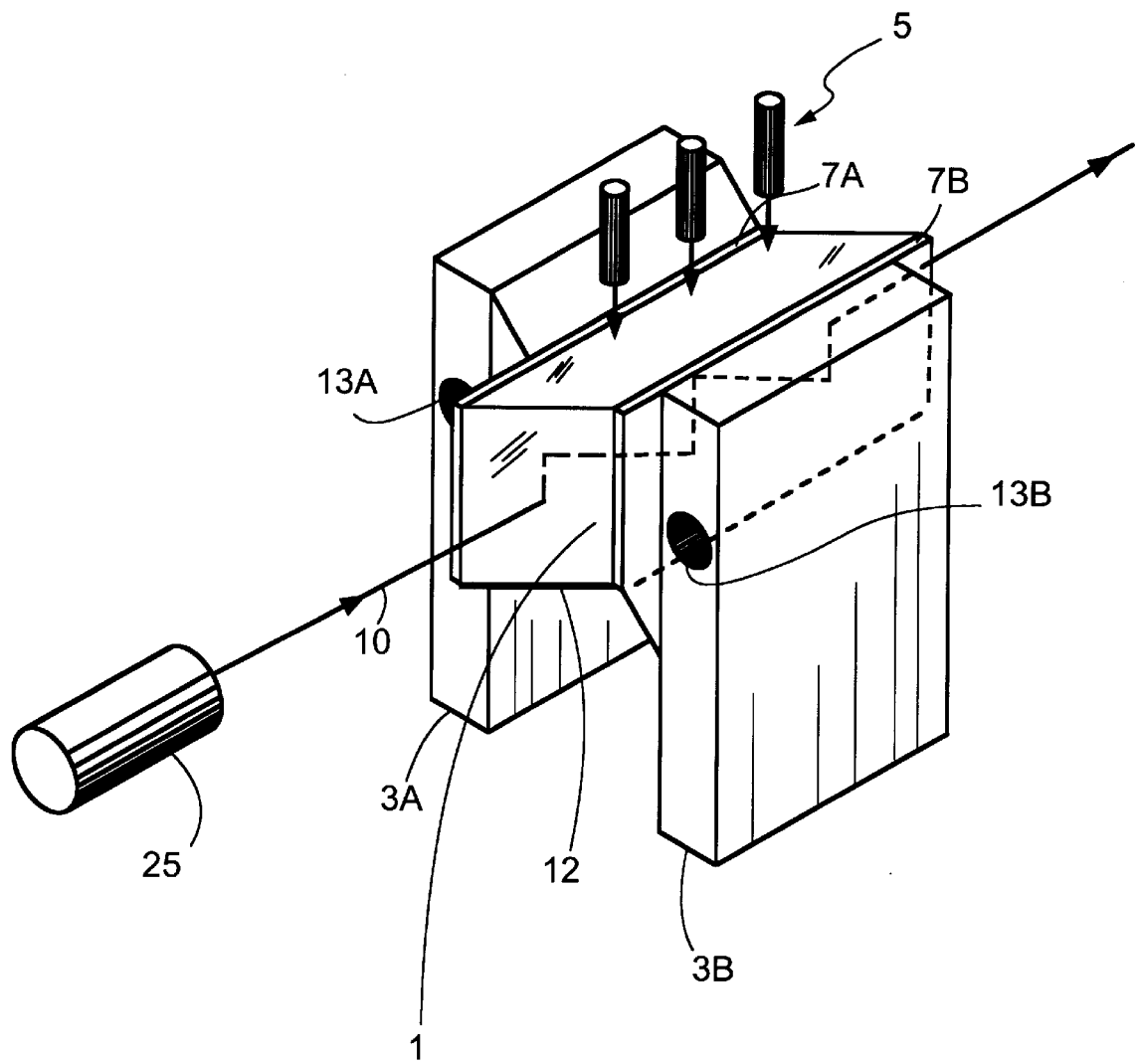
FIG. 3 is a three-dimensional view of an optical amplifier according to a second embodiment of the invention.

FIG. 3 shows a second embodiment in which the light amplification device functions as an optical amplifier. In this embodiment, the optics that cause beam 10 to propagate comprise an external laser 25. Laser 25 creates the beam 10 that is amplified in slab 1 through the stimulated emission process.

The embodiment of FIG. 2 may optionally include a shutter 14 and a control 16. Shutter 14 is positioned in a path of beam 10 such that when shutter 14 is closed, it blocks beam 10. Control 16 comprises electronics for controlling the opening and closing of shutter 14, allowing the laser to be Q-switched or mode-locked. Techniques for Q-switching and mode-locking are well known in the art. If shutter 14 is left open, the light amplification device is a continuous wave device. Shutter 14 may be incorporated into either the laser (FIG. 2) or the amplifier (FIG. 3) embodiments of the invention, so both embodiments may be Q-switched or mode-locked.

Laser slab 1 may be made of any solid laser medium. Preferably slab 1 comprises an active ion doped in a solid material. Suitable active ions include rare earth ions, actinide ions, and transition metal ions. The solid material may be a glass, oxide, fluoride, phosphate, silicate, tungstate, vanadate, molybate, or beryllate. Examples of such laser media are Nd:YAG, Nd:YLF, Nd:YVO, Nd:glass, Yb:YAG, Yb:glass, and Yb:S-FAP.

Preferably, reflective layers 7A and 7B are made from a material with an index of refraction small enough that beam 10 is totally internally reflected. Layers 7A and 7B preferably comprise silicon dioxide, magnesium fluoride, or a random copolymer of TFE and 2,2,bis-trifluoromethyl-4,5 difluoro 1,3 dioxole, sold by DuPont under the name Teflon AF (R). Alternatively, layers 7A and 7B may each comprise a gas or a liquid. In another embodiment, layers 7A and 7B reflect beam 10 directly, rather than through total internal reflection. In such an embodiment, layers 7A and 7B preferably comprise a high reflective dielectric coating.

Because of the efficiency with which slab 1 may be cooled, it is possible for slab 1 to comprise a quasi-three level, as well as a four level, system. In a typical four level system, the bottom energy level of the lasing transition is above the ground state of the medium. In a quasi-three level system, the bottom energy level of the lasing transition is only slightly above the ground state. A quasi-three level system is more difficult to operate, since the bottom energy level of the lasing transition may be thermally populated, thereby causing the laser medium to act as an absorber at the lasing wavelength. In the present invention, however, the cooling is efficient enough that such a thermal population can be minimized, making quasi-three level operation feasible.

The laser of FIG. 2 and the amplifier of FIG. 3 can be easily designed to deliver a high power by providing a high input power from pump 5. The major limitation on the power input from pump 5 is the stress fracture limit of slab 1, the point at which slab 1 will fracture due to thermal stresses. The maximum power P, divided by the length l of slab 1, that may be input is proportional to the ratio of the width w to the thickness t of slab 1:

$$(P/l)_{max} \alpha w/t$$

Here the constant of proportionality depends on the details of the composition of slab 1. An increase in the width w increases the maximum amount of power that may be input into slab 1. An increase in w also lengthens the path of light from pump 5 within slab 1, thereby increasing the amount of pump light absorbed by slab 1. That is, both the pump power input and the absorption may be simultaneously increased by increasing the width w of slab 1. The power output through beam 10 is enhanced both with greater input power and with greater absorption. Therefore, the output power can be increased by increasing the width of the slab.

The following examples are for illustrative purposes, and are not to be construed as a limitation on the scope of the invention.

EXAMPLE 1

Figure 7:
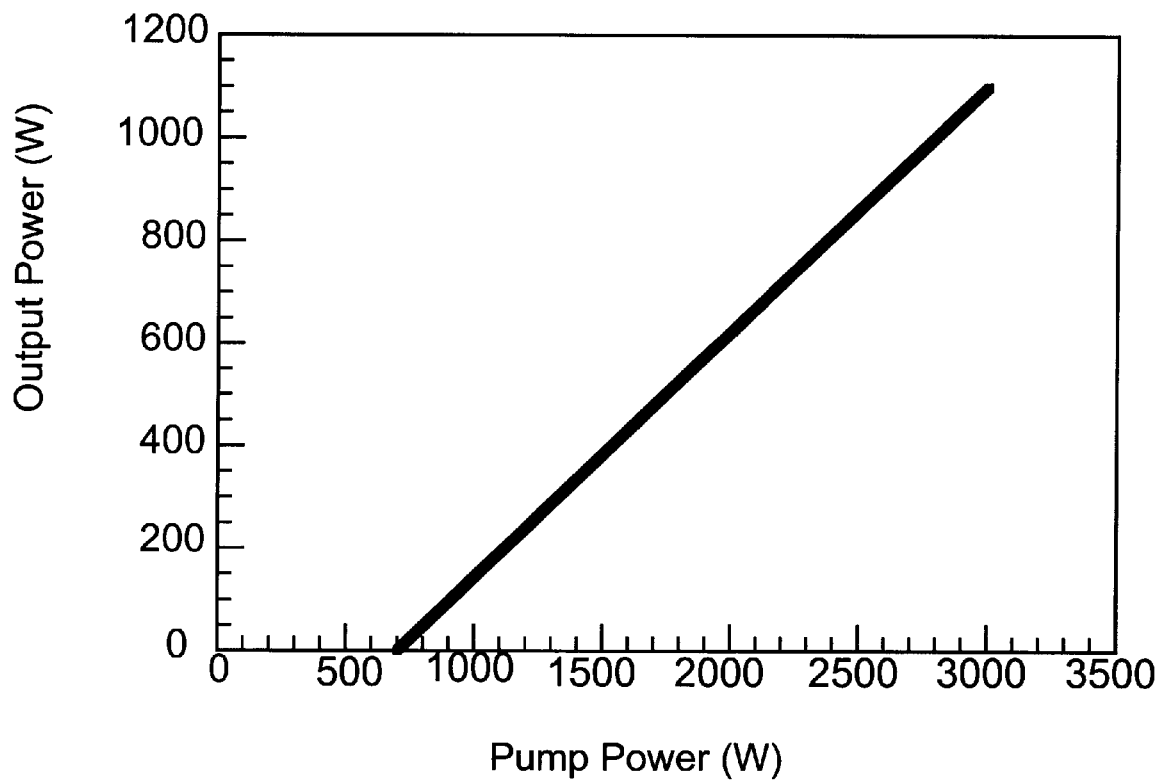
FIG. 7 shows a sample graph of the projected output power of a laser oscillator having a Yb:YAG laser slab.

The invention may function as a laser oscillator; slab 1 may comprise Yb:YAG, with a 2.9% doping of Ytterbium. Typical dimensions for slab 1 are: length l=35 mm, width w=5 mm, and thickness t=1 mm. For such a case, FIG. 7 shows a graph of the predicted output power versus power input through pump 5. An input power of 3000 Watts is 15% of the maximum power that may be input before the slab of this example fractures due to stresses.

EXAMPLE 2

Figure 8:
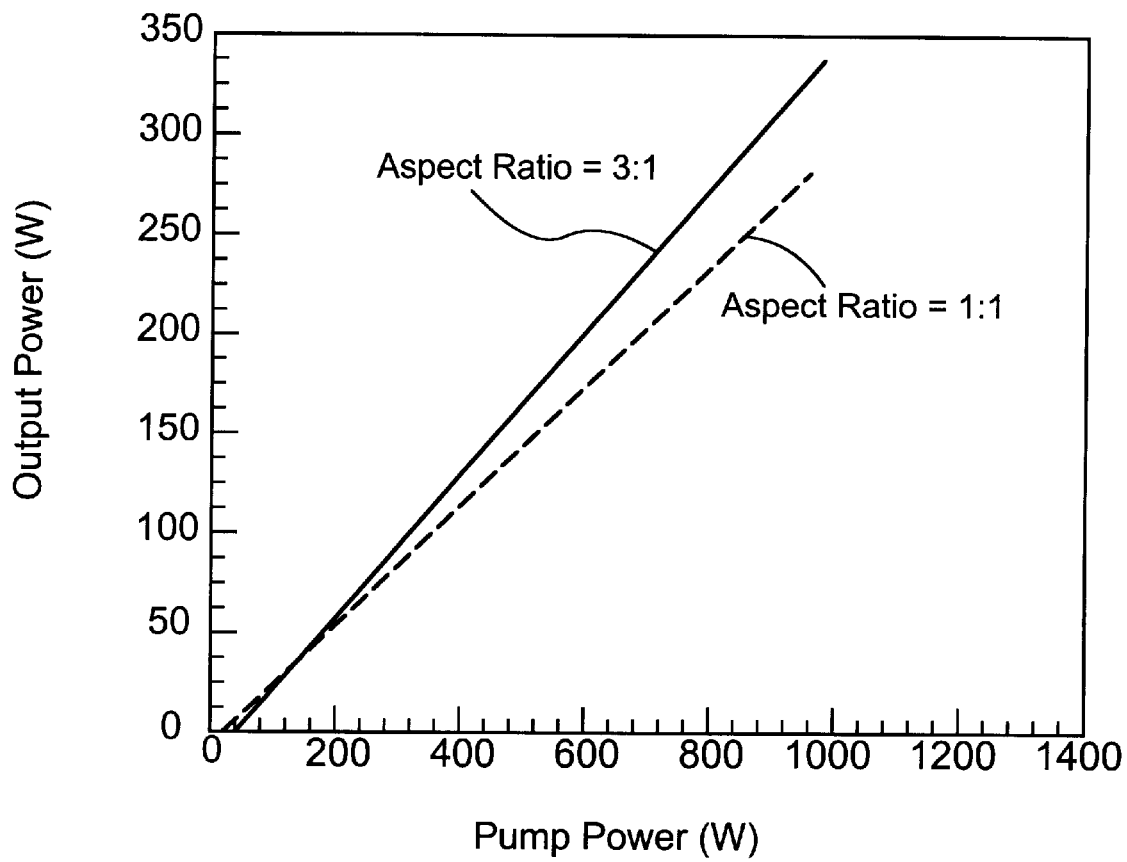
FIG. 8 shows a sample graph of the projected output power of a laser oscillator having a Nd:YAG laser slab.

The invention again may function as a laser oscillator; slab 1 comprises Nd:YAG and has length l=60 mm and thickness t=1.7 mm. The aspect ratio of slab 1 is defined as the ratio of the width to the thickness, w/t. The dashed line of FIG. 8 shows the predicted output power versus input power for the laser oscillator with an aspect ratio of 1:1. The solid line of FIG. 8 shows the power output for an aspect ratio of 3:1.

Figure 6:
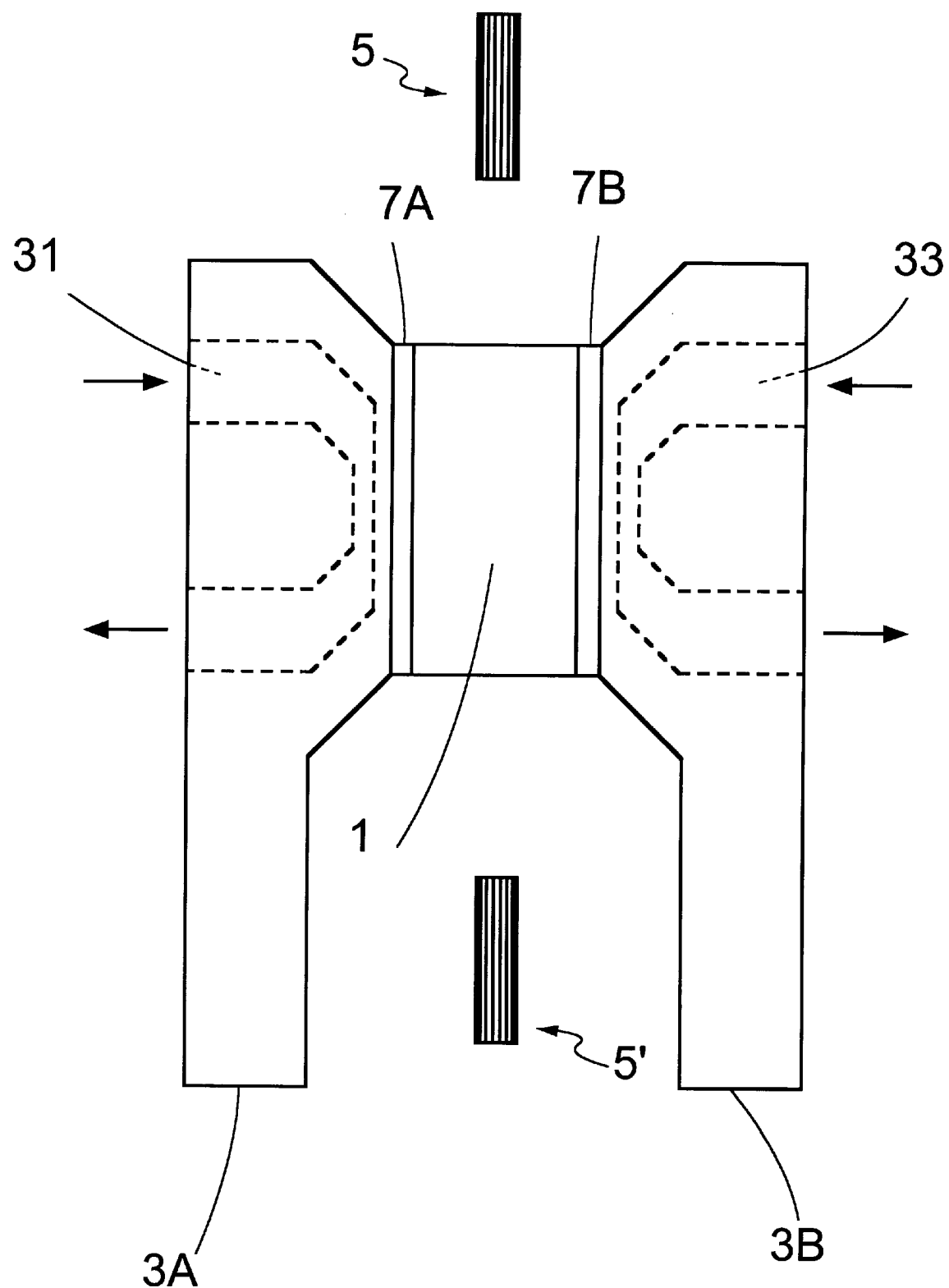
FIG. 6 is a front view of a slab laser according to an alternative embodiment of the invention.

There are many alternatives to the preferred heat sinks 3A and 3B of FIGS. 2, 3, and 4. FIG. 6 shows another way to flow liquid through heat sinks 3A and 3B. Water or other fluid flows (as indicated by arrows) through channels 31 and 33. Still other geometries may be used, and in some embodiments, heat sinks 3A and 3B are not cooled by fluids at all.

It is also possible for heat sink 3A to be unsymmetrical with heat sink 3B. For example, in one embodiment heat sink 3A is as shown in FIG. 2, but reflective layer 7B is open to the atmosphere. In other words, in this embodiment, heat sink 3B is simply air. Whether or not heat sinks 3A and 3B are symmetrical with each other, they draw heat evenly across the width of slab 1. This ensures that the thermal gradient lies in the plane propagation of beam 10, so that thermal tensing and stress birefringent effects are canceled by the zig-zag path of the beam.

In another embodiment, heat sinks 3A and 3B comprise a fluid and a ductwork for carrying the fluid directly to reflective layers 7A and 7B. Preferred fluids include water, ethylene glycol, and methanol. In another embodiment, heat sinks 3A and 3B comprise a gas, such as air.

FIG. 6 also shows a different method of pumping slab 1. There is no reflector 12; instead a second optical pump 5' is present. Light from second pump 5' enters slab 1 through bottom face 56 in a direction substantially anti-parallel to the direction of propagation of light from pump 5.

Figure 9A:
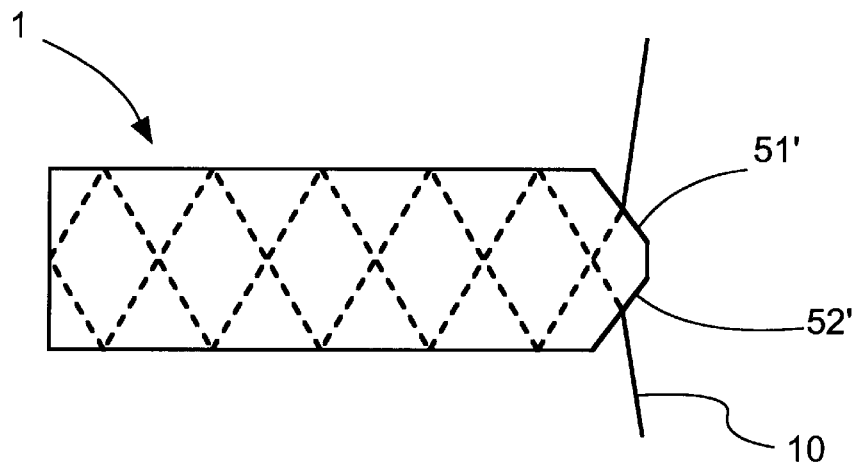
FIGS. 9a, 9b, and 9c show alternative shapes for the laser slab.
Figure 9B:
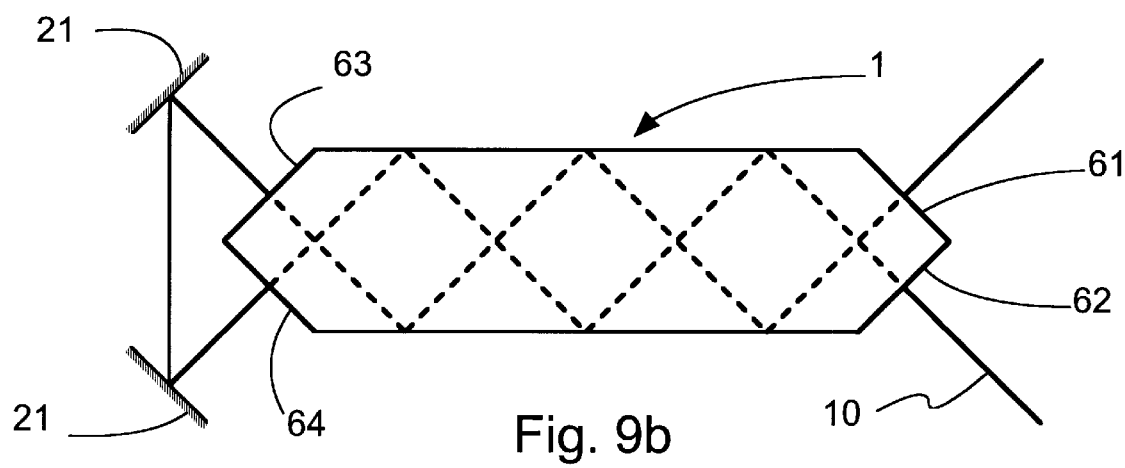
Figure 9C:
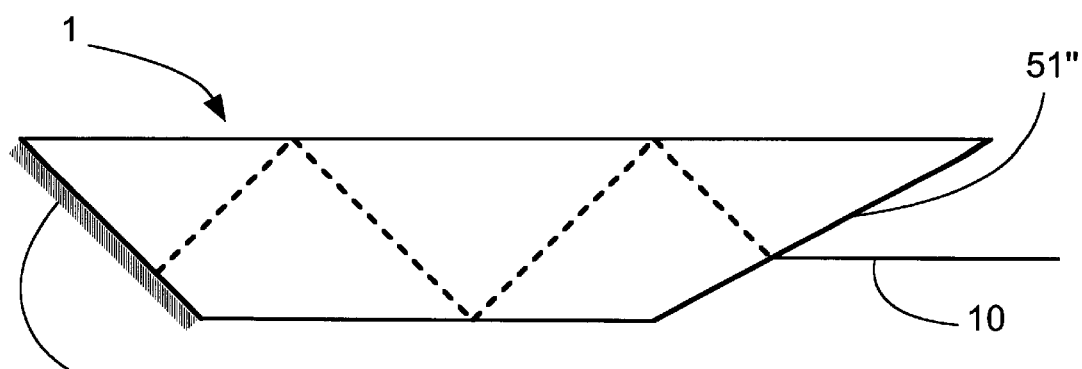

There are many alternative shapes for slab 1. In FIG. 9a, slab 1 has end faces 51' and 52' on the same side of slab 1, rather than on opposite sides as in FIG. 2. In FIG. 9b, slab 1 has four end faces 61, 62, 63, and 64. Two additional mirrors 21 are used in this arrangement. In FIG. 9c, slab 1 has an end face 51"; another face is covered with a reflective material 73 that reflects beam 10 directly back into slab 1. FIGS. 9a, 9b, and 9c are intended to give an idea of the variety of shapes possible for slab 1; the figures do not represent an exhaustive list.

Figure 10A:
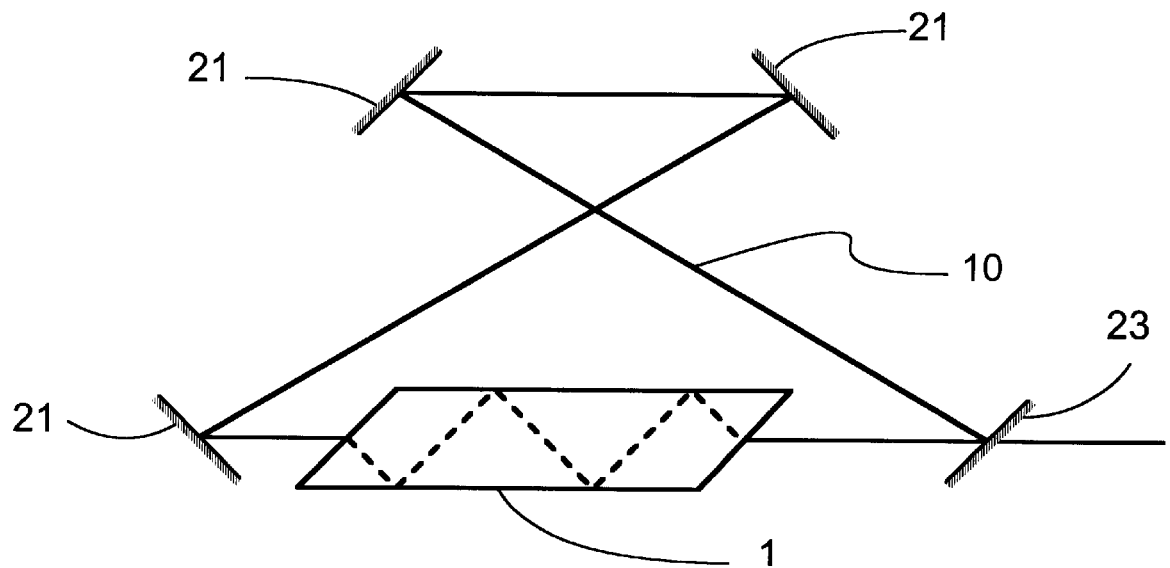
FIGS. 10a and 10b show alternative configurations for an optical beam at the lasing wavelength.
Figure 10B:
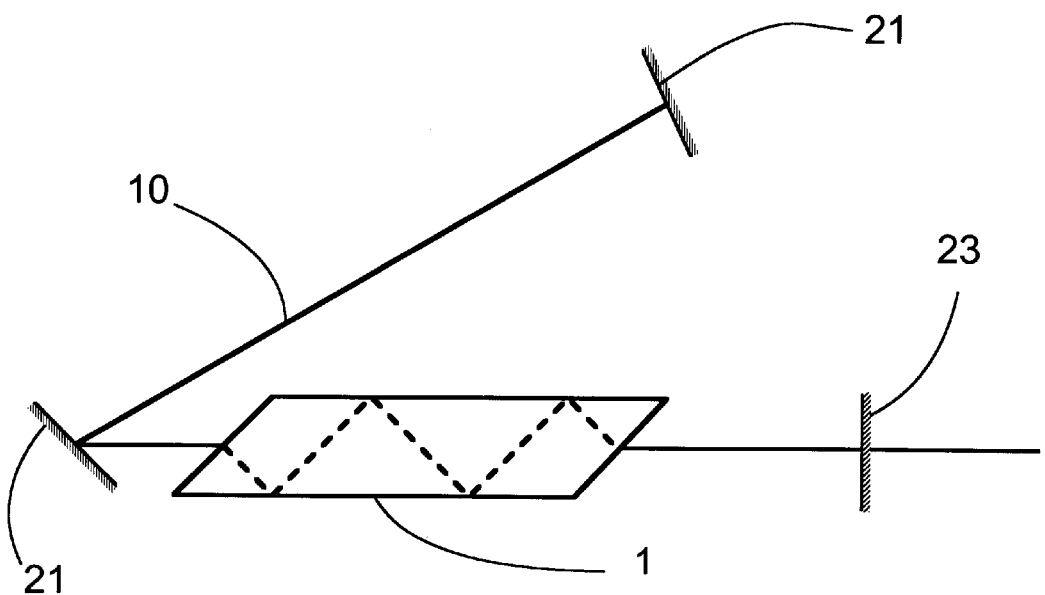

There are also many alternative geometries that beam 10 may have. FIGS. 10a and 10b show alternative optics for making an optical resonator, where the invention functions as a laser. FIG. 10a shows a "ring laser" configuration, using mirrors 21 and output coupler 23. The configuration of FIG. 10b is known as a "folded cavity" and is accomplished using mirrors 21 and output coupler 23. Both ring lasers and folded cavities are well known in the art. FIGS. 10a and 10b exemplify, but do not exhaust, the possible configurations of beam 10.

Many more alternatives exist. For example, one may combine the slab shape of FIG. 9a with the ring laser geometry of FIG. 10a. It is clearly possible, then, to vary the apparatus greatly and still remain within the scope of the invention. Accordingly, the scope of the invention should be determined by the following claims and their legal equivalents.

We claim:

1. A light amplification device, comprising:
   a) a slab laser having first and second reflecting faces, a first pumping face that is different from said first and second reflecting faces, and an end face;
   b) first and second reflective layers covering the first and second reflecting faces, respectively;
   c) a first heat sink for conducting heat away from the first reflecting face wherein the first heat sink is in thermal contact with the reflecting face, but not the pumping face;
   d) a first optical pump for irradiating the laser slab through the first pumping face; and
   e) optics for causing an optical beam to propagate inside the laser slab between the reflecting faces along a zig-zag path, wherein the optical beam passes through the end face.

2. The device of claim 1, wherein the optics comprise a resonator, whereby the light amplification device functions as a laser oscillator.

3. The device of claim 1, wherein the optics comprise an external laser, whereby the light amplification device functions as an optical amplifier.

4. The device of claim 1, wherein the laser slab comprises an active ion selected from the group consisting of rare earth ions, actinide ions, and transition metal ions, and wherein the active ion is doped in a solid material selected from the group consisting of glasses, oxides, fluorides, phosphates, silicates, tungstates, vanadates, molybates, and beryllates.

5. The device of claim 1, further comprising a thermal contact layer placed between the first reflective layer and the first heat sink.

6. The device of claim 5, wherein the thermal contact layer comprises a metal selected from the group consisting of gold, Indium, and copper.

7. The device of claim 1, further comprising a second heat sink for conducting heat away from the second reflecting face.

8. The device of claim 1, wherein the first optical pump comprises a plurality of diode lasers.

9. The device of claim 1, further comprising an anti-reflective coating placed on the first pumping face for diminishing reflections from the first optical pump.

10. The device of claim 1, wherein the laser slab further comprises a second pumping face.

11. The device of claim 10, wherein the second pumping face is covered with a material that reflects light at the same wavelength as light emitted from the first optical pump.

12. The device of claim 10, further comprising a second optical pump for irradiating the laser slab through the second pumping face.

13. The device of claim 1, wherein the first and second reflective layers comprise a material selected from the group consisting of $SiO_2$, $MgF_2$, and a random copolymer of TFE and 2,2,bis-trifluoromethyl-4,5 difluoro 1,3 dioxole.

14. The device of claim 1, wherein the first and second reflective layers comprise a reflective dielectric coating.

15. The device of claim 1, wherein the first heat sink comprises a metal.

16. The device of claim 1, wherein the first heat sink comprises a liquid.

17. The device of claim 1, wherein the first heat sink comprises a gas.

18. The device of claim 1, wherein the optics are positioned such that the optical beam exits the laser slab through the end face at Brewster's angle with respect to a normal to the end face.

19. The device of claim 1, further comprising:
   a) a shutter positioned in a path of the optical beam; and
   b) electronics for controlling the shutter.

20. A light amplification device comprising:
   a) a slab of laser medium having first and second reflecting faces;
   b) first and second reflective layers covering the first and second reflecting faces, respectively;
   c) a first optical pump positioned such that light from the first optical pump has a first direction of incidence upon the slab;
   d) optics for causing an optical beam to propagate inside the slab in a zig-zag path between the reflecting faces, the path lying in a plane of propagation; and
   e) a heat sink for causing heat to flow out of the slab through the first reflecting face in a direction parallel to the plane of propagation whereby the first heat sink cools the reflecting face, but not the pumping face;
   wherein the plane of propagation is substantially perpendicular to the first direction of incidence, whereby energy from the first optical pump is deposited into the optical beam.

21. The device of claim 20, wherein the heat sink comprises a metal.

22. The device of claim 20, further comprising a thermal contact layer placed between the heat sink and the slab.

23. The device of claim 22, wherein the thermal contact layer comprises a metal selected from the group consisting of gold, Indium, and copper.

24. The device of claim 20, wherein the first and second reflective layers comprise a material having an index of refraction sufficiently small to ensure that the beam is totally internally reflected by the reflecting faces.

25. The device of claim 20, wherein the first and second reflective layers comprise a highly reflective dielectric coating.

26. The device of claim 20, wherein the optics comprise a resonator, whereby the light amplification device functions as a laser oscillator.

27. The device of claim 20, wherein the optics comprise an external laser, whereby the light amplification device functions as an optical amplifier.

28. The device of claim 20, wherein the slab comprises an active ion selected from the group consisting of rare earth ions, actinide ions, and transition metal ions, and wherein the active ion is doped in a solid material selected from the group consisting of glasses, oxides, fluorides, phosphates, silicates, tungstates, vanadates, molybates, and beryllates.

29. The device of claim 20, wherein the first optical pump comprises a plurality of diode lasers.

30. The device of claim 20, further comprising a second optical pump for pumping light having a second direction of incidence upon the slab, wherein the second optical pump is positioned such that the second direction of incidence is substantially anti-parallel to the first direction of incidence.

31. The device of claim 20, further comprising:
   a) a shutter positioned in a path of the optical beam; and
   b) electronics for controlling the shutter.

32. A light amplification device comprising:
   a) a slab of laser medium having first and second reflecting faces and first and second pumping faces that are different from said reflecting faces;
   b) a first optical pump positioned such that light from the first optical pump has a first direction of incidence upon the slab;
   c) optics for causing an optical beam to propagate inside the slab in a zig-zag path between the reflecting faces, the path lying in a plane of propagation; and
   d) a heat sink for causing heat to flow out of the slab through the first reflecting face in a direction parallel to the plane of propagation whereby the heat sink cools the reflecting faces but not the pumping faces;
   wherein the plane of propagation is substantially perpendicular to the first direction of incidence, whereby energy from the first optical pump is deposited into the optical beam.

* * * * *